(12) United States Patent
Gooden et al.

(10) Patent No.: US 10,132,403 B1
(45) Date of Patent: Nov. 20, 2018

(54) ENGINE AND TRANSMISSION TEMPERATURE CONTROL SYSTEM

(71) Applicant: Ford Global Technologies, LLC, Dearborn, MI (US)

(72) Inventors: James Thomas Gooden, Canton, MI (US); Michael Joseph Giunta, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/598,698

(22) Filed: May 18, 2017

(51) Int. Cl.
| | | |
|---|---|---|
| *F01P 5/10* | (2006.01) | |
| *F01P 7/16* | (2006.01) | |
| *F16H 57/04* | (2010.01) | |
| *F01P 11/08* | (2006.01) | |

(52) U.S. Cl.
CPC ............ *F16H 57/0475* (2013.01); *F01P 5/10* (2013.01); *F01P 7/16* (2013.01); *F01P 11/08* (2013.01); *F16H 57/0413* (2013.01)

(58) Field of Classification Search
CPC .... F01P 2060/08; F01P 2060/045; F01P 7/16; F01P 2060/04; F01P 2025/12; F16H 57/0415
See application file for complete search history.

(56) References Cited

U.S. PATENT DOCUMENTS

| | | | | |
|---|---|---|---|---|
| 7,073,467 | B2 * | 7/2006 | Kanno | F01P 7/165 123/41.33 |
| 7,237,511 | B2 * | 7/2007 | Aoki | B60H 1/00885 123/41.08 |
| 8,342,418 | B2 * | 1/2013 | Kanzaka | F01M 5/007 236/93 R |
| 8,459,389 | B2 * | 6/2013 | Myers | B60L 11/14 123/41.08 |
| 8,689,741 | B2 | 4/2014 | Park et al. | |
| 9,188,055 | B2 | 11/2015 | Potter | |
| 2005/0199193 | A1 * | 9/2005 | Hutchins | F01P 7/165 123/41.08 |
| 2009/0272441 | A1 * | 11/2009 | Sasaki | F01P 7/16 137/468 |
| 2011/0120396 | A1 * | 5/2011 | Myers | F01P 11/08 123/41.08 |
| 2015/0096509 | A1 * | 4/2015 | Potter | F16H 57/0413 123/41.33 |

(Continued)

*Primary Examiner* — Long T Tran
(74) *Attorney, Agent, or Firm* — James Dottavio; Brooks Kushman P.C.

(57) ABSTRACT

A transmission oil cooler transfers heat between Automatic Transmission Fluid (ATF) and engine coolant. During initial vehicle warm-up, heat is transferred from the engine coolant to the ATF, assisting the transmission warm-up. A priority valve may limit the flow of coolant to the transmission oil cooler until the coolant temperature is sufficient to ensure adequate cabin heating performance. After both the engine and transmission have reached normal operating temperatures, heat is transferred from the ATF to the engine coolant. An auxiliary radiator pre-cools the engine coolant before it enters transmission oil cooler. This increases the cooling of the ATF and avoids coolant temperature increase during aggressive maneuvers. When the ATF temperature is below a threshold, a coolant control valve diverts coolant around the auxiliary radiator.

15 Claims, 2 Drawing Sheets

(56) References Cited

U.S. PATENT DOCUMENTS

| | | | |
|---|---|---|---|
| 2015/0159538 A1* | 6/2015 | Jeong | B60H 1/00642 701/36 |
| 2016/0010535 A1 | 1/2016 | Lee | |
| 2016/0084142 A1 | 3/2016 | Gooden et al. | |
| 2016/0138878 A1* | 5/2016 | Gopal | F01P 3/20 165/103 |
| 2016/0363038 A1 | 12/2016 | Kawamoto | |
| 2016/0376977 A1* | 12/2016 | Watanabe | F01P 5/12 123/41.08 |
| 2017/0022881 A1* | 1/2017 | Matsumoto | F01P 7/16 |
| 2017/0037954 A1* | 2/2017 | Shiina | F16H 57/0417 |

* cited by examiner

ENGINE AND TRANSMISSION TEMPERATURE CONTROL SYSTEM

TECHNICAL FIELD

This application relates to a temperature control system for a vehicle, in particular for cooling an engine and an automatic transmission.

BACKGROUND

Automatic transmissions include meshing gearing elements, which can be lubricated and cooled with Automatic Transmission Fluid (ATF). Ideally, the temperature of the ATF should be maintained in a narrow range. If the ATF is too hot, it is not as effective as a lubricant and is less effective in removing heat from components. Additionally, chemical reactions may occur which change the friction properties of clutches and brakes. If the ATF is too cold, it has high viscosity, causing drag and making it difficult to force the ATF to some of the components that need lubrication.

Similarly, engines may use a liquid coolant to remove heat. The coolant may also be used to provide heat, such as too the passenger cabin via a heater core. Therefore, it is desirable to maintain the temperature of the coolant in a narrow range. Heat is typically extracted from the coolant by a liquid to air heat exchanger called a radiator.

The operating temperature range for engine coolant is typically less than the operating temperature range for transmission fluid. Therefore, heat from the ATF may be transferred to engine coolant using a liquid to liquid heat exchanger called a transmission oil cooler. However, the additional heat input into the coolant may limit the ability to control the coolant temperature during period of very aggressive vehicle operation. When a vehicle starts operating from an initial cold condition, the engine coolant typically warms up to normal operating temperature more quickly than the ATF. Therefore, during this warm-up phase, the transmission oil cooler may be used to transfer heat from the coolant to the ATF, reducing the time that the transmission must operate with cold ATF. Although this improves the performance of the transmission, it may degrade the performance of the cabin heating system.

SUMMARY

A vehicle includes a transmission, a transmission oil cooler, a transmission fluid circuit, an engine, a pump, primary and auxiliary radiators, and at least first and second engine coolant circuits. The transmission oil cooler is configured to transfer heat between Automatic transmission Fluid (ATF) and engine coolant. The transmission fluid circuit conveys ATF from the transmission, through the transmission oil cooler, back to the transmission. The first engine coolant circuit conveys coolant from the pump outlet, through the engine and the primary radiator, to the pump inlet. The second engine coolant circuit conveys coolant from the pump outlet, through the auxiliary radiator and the transmission oil cooler, to the pump inlet. The second engine coolant circuit may include a control valve to selectively divert engine coolant around the auxiliary radiator based on an ATF temperature. ATF may be routed through the control valve such that the control valve directly senses the ATF temperature. Alternatively, the control valve may divert flow around the auxiliary radiator based on an electrical signal from a controller, which is in turn based on a signal from an ATF temperature sensor. The first engine coolant circuit may also include a thermostat configured to selectively divert engine coolant around the primary radiator based on an engine coolant temperature. A third engine coolant circuit may convey coolant from the pump outlet, through the engine and a cabin heat heater core, to the pump inlet. A priority valve may restrict flow of engine coolant in the second coolant circuit based on an engine coolant temperature.

A cooling system includes a pump and first and second engine coolant circuits. The first engine coolant circuit conveys coolant from the pump outlet, through an engine and a primary radiator, to the pump inlet. The second engine coolant circuit conveys coolant from the pump outlet, through a transmission oil cooler, to the pump inlet. The second engine coolant circuit includes a control valve to selectively divert coolant through an auxiliary radiator based on a fluid temperature such as a transmission fluid temperature. The first engine coolant circuit may also include a thermostat configured to selectively divert engine coolant around the primary radiator based on an engine coolant temperature. A third engine coolant circuit may convey coolant from the pump outlet, through the engine and a cabin heat heater core, to the pump inlet. A priority valve may restrict flow of engine coolant in the second coolant circuit based on an engine coolant temperature.

A method of regulating coolant and transmission temperatures includes routing ATF through a transmission oil cooler, pumping engine coolant at a flow rate, and routing at least first and second fraction of the flow rate through specified components. The first fraction of the flow rate is routed through an engine and a primary radiator. The second fraction of the flow rate is routed through an auxiliary radiator and the transmission oil cooler. A third fraction of the flow rate may be routed through the transmission oil cooler, bypassing the auxiliary radiator. The second fraction may be increased and the third fraction decreased in response to an increase in a temperature of the ATF. A sum of the second and third fractions may be increased in response to an increase in a temperature of the engine coolant.

Embodiments according to the present disclosure provide a number of advantages. For example, cooling systems according to the present disclosure may cool transmission fluid to lower temperatures than known systems that use one transmission oil cooler and avoids the need for a oil to air transmission oil cooler. In addition, cooling systems according to the present disclosure maintain transmission fluid within allowable temperature ranges. Furthermore, cooling systems according to the present disclosure may prioritize cabin heating when preferable, such that consumer comfort is not adversely impacted.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
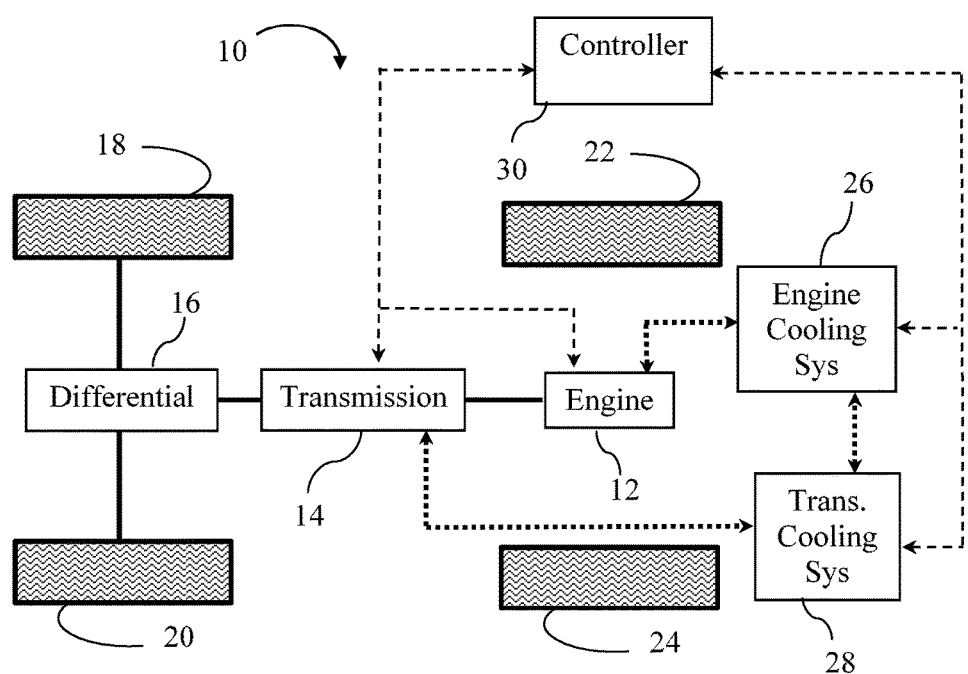
FIG. 1 schematically illustrates a vehicle powertrain with engine and transmission cooling systems.

FIG. 1 is a schematic depiction of a vehicle powertrain 10. Mechanical power connections are depicted by bold solid lines. Power is generated by internal combustion engine 12. Transmission 14 adjusts the speed and torque according to vehicle needs. At low vehicle speeds, the transmission reduces the speed and multiplies the torque. At high speeds, the transmission increases the speed, permitting the engine to operate an efficient crankshaft speed. Differential 16 divides the power between driven wheels 18 and 20, allowing slight speed differences as the vehicle turns. Wheels 22 and 24 are not powered. Although FIG. 1 illustrates a rear wheel drive powertrain, the inventive concept is also applicable to front wheel drive, four wheel drive, and all wheel drive configurations.

The flow of fluids is illustrated in FIG. 1 by dotted lines. Engine coolant flows between the engine 12 and the engine cooling system 26. ATF flows between the transmission 14 and the transmission cooling system 28. Engine coolant may also flow between the engine cooling system 26 and the transmission cooling system 28.

In FIG. 1, information signals are depicted as dashed lines. Controller 30 sends commands to engine 12 and transmission 14 to control the powertrain. The controller may utilize sensors in the transmission and engine to determine what commands to issue. Similarly, the controller may send signals to the engine cooling system 26 and the transmission cooling system 28 and may rely on information from sensors in these systems. Controller 30 may be a single controller or may be multiple controllers such as an engine controller and a transmission controller.

Figure 2:
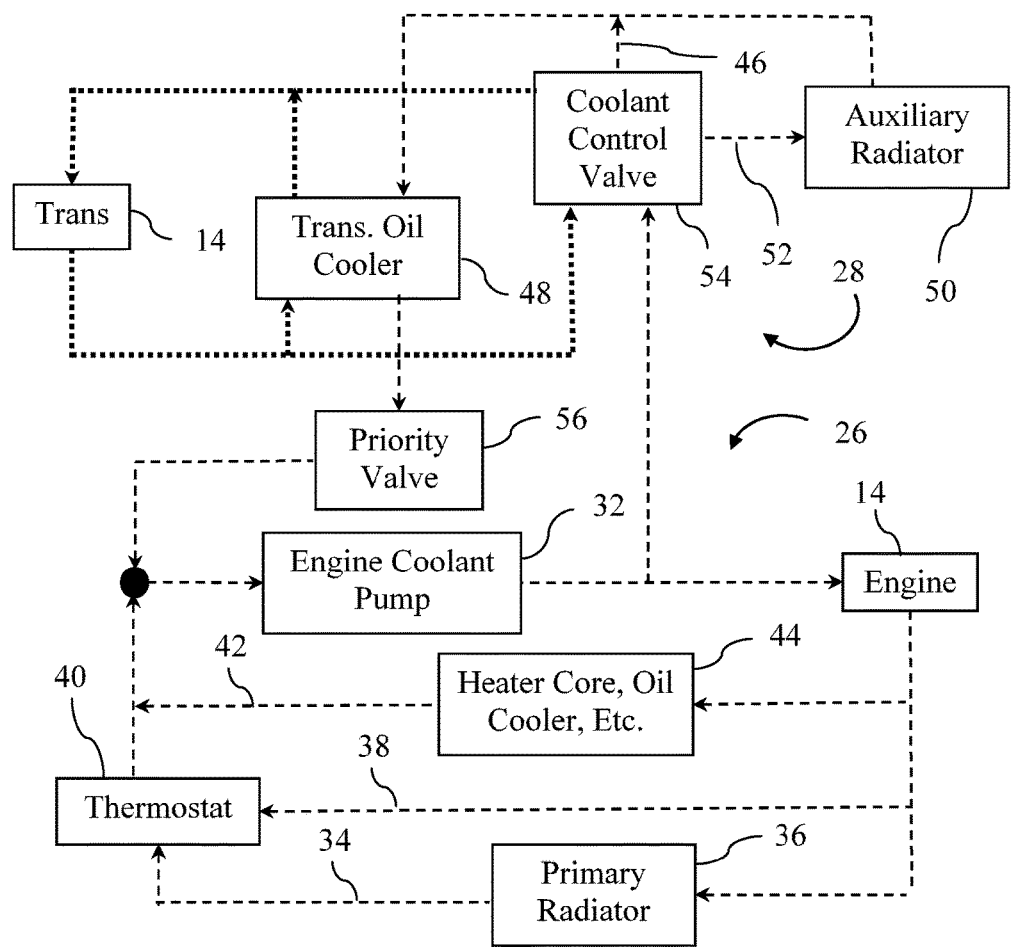
FIG. 2 schematically illustrates the transmission and engine cooling systems of FIG. 1.

FIG. 2 depicts the engine cooling system 26 and the transmission cooling system 28 in more detail. In FIG. 2, the flow of engine coolant is depicted by dashed lines and the flow of ATF is depicted by dotted lines. Engine coolant pump 32 propels the engine coolant through several coolant circuits. Several valves control what proportional of the total flow is routed through each of the coolant circuits, as discussed in more detail below. A primary radiator circuit 34 routes engine coolant from the outlet of pump 32, through engine 14, then through a primary radiator 36, then back to the inlet of pump 32. Bypass circuit 38 routes coolant around the primary radiator 36. Thermostat 40 controls the relative flow rates of circuits 34 and 38 based on temperature of the coolant. When the coolant is below a target operating temperature, thermostat 40 routes all or most of the fluid through bypass circuit 38. Thermostat 40 may be either upstream or downstream of the primary radiator. Once the coolant temperature reaches the target operating temperature, thermostat 40 increases the flow rate through primary radiator 36 to the extent necessary to maintain the coolant at the target operating temperature. Accessory circuit 42 routes coolant through engine 12 and several other components such as the heater core for the cabin heat system and an oil cooler. The accessory circuit may contain additional valves (not shown) that adjust the flow to these various components.

Circuit 46 routes coolant from the pump outlet, through transmission oil cooler 48, and back to the pump inlet. ATF is also routed from the transmission 14 through the transmission oil cooler 48. Heat flows from the warmer fluid to the cooler fluid. During a warm-up period, heat may be transferred from the coolant to the ATF to actively warm the ATF faster, minimizing the time that the ATF is cold. Once both fluids have reached normal operating temperature, heat is transferred from the ATF to the coolant to cool the ATF. To maximize heat removal from the ATF, it is desirable to increase the temperature difference by reducing the coolant temperature. Toward this end, the coolant is routed to the transmission oil cooler at the point in the engine cooling system with the lowest temperature and sufficient pressure, just before re-entering the engine. To further reduce the coolant temperature, the coolant may be selectively routed through auxiliary radiator 50 via circuit 52. Coolant control valve 54 adjust the relative flow rates of circuits 46 and 52 based on the temperature of the ATF. When the ATF is below a threshold, coolant control valve 54 reduces the flow rate through the auxiliary radiator 50, preferably to zero, such that the ATF warms toward normal operating temperature as quickly as possible. When the ATF temperature is at or above the threshold, coolant control valve 54 reduces the flow through circuit 46, which bypasses the auxiliary radiator, to maximize the flow through the auxiliary radiator. In addition to maximizing the heat transfer from the ATF, this reduces the temperature of the coolant returning to the engine, which can be important during aggressive operation.

During cold weather operation, use of engine heat to accelerate warm-up of the ATF may delay the availability of cabin heat. To avoid this, priority valve 56 reduces the flow of coolant through the transmission oil cooler until the coolant exiting transmission oil cooler 48 reaches a second temperature threshold. This second threshold is above the coolant temperature at which cabin heating is effective. The temperature of the coolant exiting the transmission oil cooler is influenced by the temperature of the ATF.

In FIG. 2, thermostat 40, coolant control valve 54, and priority valve 56 are illustrated at passive mechanical valves. For example, they may utilize a chamber filled with a wax that is formulated to melt at the threshold temperature. As such, they must be exposed to the fluid associated with the corresponding temperature condition. For thermostat 40 and priority valve 56, the fluid associated with the temperature condition is the same fluid that is controlled by the valve. Priority valve 56 may have a minimum flow rate in the closed position to ensure that the temperature sensed is sufficiently representative of the coolant temperature in the remainder of the system. For coolant control valve 54, a flow rate of ATF is routed through the control valve to provide the temperature reference. In alternative embodiments, these valves may be electrically actuated by controller 30 based on temperature sensors that are not physically proximate to the valve. In the case of electric actuation, the controller may utilize additional sensors and more sophisticated logic. For example, ambient temperature, engine coolant temperature, and the cabin heat setting may influence whether to bypass the auxiliary radiator and/or limit flow with the priority valve.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a transmission;
    a transmission oil cooler configured to transfer heat between Automatic Transmission Fluid (ATF) and engine coolant;
    a transmission fluid circuit configured to convey ATF from the transmission, through the transmission oil cooler, back to the transmission;
    an engine;
    a pump having an outlet and an inlet;
    a primary radiator;
    an auxiliary radiator;
    a first engine coolant circuit from the pump outlet, through the engine and the primary radiator, to the pump inlet; and
    a second engine coolant circuit from the pump outlet, through the auxiliary radiator and the transmission oil cooler, to the pump inlet.

2. The vehicle of claim 1 wherein the second engine coolant circuit further includes a control valve configured to selectively divert engine coolant around the auxiliary radiator based on an ATF temperature.

3. The vehicle of claim 2 wherein ATF is routed through the control valve such that the control valve directly senses the ATF temperature.

4. The vehicle of claim 2 wherein the control valve diverts flow around the auxiliary radiator based on an electrical signal from a controller, which is in turn based on a signal from an ATF temperature sensor.

5. The vehicle of claim 2 wherein the first engine coolant circuit further includes a thermostat configured to selectively divert engine coolant around the primary radiator based on an engine coolant temperature.

6. The vehicle of claim 2 further comprising a third engine coolant circuit from the pump outlet, through the engine and a cabin heat heater core, to the pump inlet.

7. The vehicle of claim 6 further comprising a priority valve configured to restrict flow of engine coolant in the second coolant circuit based on an engine coolant temperature.

8. A cooling system comprising:
    a pump having an outlet and an inlet;
    a first engine coolant circuit from the pump outlet, through an engine and a primary radiator, to the pump inlet; and
    a second engine coolant circuit from the pump outlet, through a transmission oil cooler, to the pump inlet, the second engine coolant circuit including a control valve to selectively divert coolant through an auxiliary radiator based on a fluid temperature.

9. The cooling system of claim 8 wherein the control valve selectively directs coolant through the auxiliary radiator in response to a transmission fluid temperature being greater than a threshold temperature.

10. The cooling system of claim 8 wherein the first engine coolant circuit further includes a thermostat configured to selectively divert engine coolant around the primary radiator based on an engine coolant temperature.

11. The cooling system of claim 8 further comprising a third engine coolant circuit from the pump outlet, through the engine and a cabin heat heater core, to the pump inlet.

12. The cooling system of claim 11 further comprising a priority valve configured to restrict flow of engine coolant in the second coolant circuit based on an engine coolant temperature.

13. A method of regulating coolant and transmission temperatures comprising:
    routing Automatic Transmission Fluid (ATF) through a transmission oil cooler;
    pumping engine coolant at a flow rate;
    routing a first fraction of the flow rate through an engine and a primary radiator; and
    routing a second fraction of the flow rate through an auxiliary radiator and the transmission oil cooler.

14. The method of claim 13 further comprising:
    routing a third fraction of the flow rate through the transmission oil cooler, bypassing the auxiliary radiator; and
    increasing the second fraction and decreasing the third fraction in response to an increase in a temperature of the ATF.

15. The method of claim 14 further comprising increasing a sum of the second and third fractions in response to an increase in a temperature of the engine coolant.

* * * * *